United States Patent [19]

Dunlap et al.

[11] 4,420,458

[45] Dec. 13, 1983

[54] NUCLEAR FUEL ASSEMBLY WITH COOLANT CONDUCTING TUBE

[75] Inventors: Thomas G. Dunlap; William G. Jameson, Jr., both of San Jose; Carl R. Mefford, Los Gatos; Harold L. Nelson; James E. Cearley, both of San Jose, all of Calif.

[73] Assignee: General Electric Company, San Jose, Calif.

[21] Appl. No.: 258,639

[22] Filed: Apr. 29, 1981

[51] Int. Cl.³ .............................................. G21C 3/32
[52] U.S. Cl. .................................... 376/447; 376/440; 376/451; 376/453
[58] Field of Search ............... 376/364, 365, 440, 442, 376/443, 445, 451, 453, 454, 447

[56] References Cited

U.S. PATENT DOCUMENTS

| 3,423,287 | 1/1969 | Anthony et al. | 376/445 X |
| 3,466,226 | 9/1969 | Lass | 376/451 X |
| 3,802,995 | 4/1974 | Fritz et al. | |
| 3,963,566 | 6/1976 | MacMillan et al. | 376/451 X |
| 4,022,661 | 5/1977 | Smith et al. | 376/451 X |
| 4,135,971 | 1/1979 | Calvin | 376/365 |
| 4,304,631 | 12/1981 | Walton et al. | 376/364 X |
| 4,313,796 | 2/1982 | Buettiker | 376/443 X |

FOREIGN PATENT DOCUMENTS 53-107586  9/1978  Japan .................... 376/451

Primary Examiner—Peter A. Nelson
Attorney, Agent, or Firm—Ivor J. James, Jr.; Samuel E. Turner; Raymond G. Simkins

[57] ABSTRACT

In a nuclear fuel assembly having a coolant conducting or water tube which also retains the spacers in axial position, the fuel rods experience greater axial growth with exposure than the water tube creating a risk that the water tube might become disengaged from the supporting tie plates. An arrangement for preventing such disengagement is described including lengthened end plug shanks for the water tube, a protective boss surrounding the lower end plug shank to protect it from flow induced vibration, a conical seat for the lower end plug and an arrangement for limiting upward movement of the water tube.

10 Claims, 8 Drawing Figures

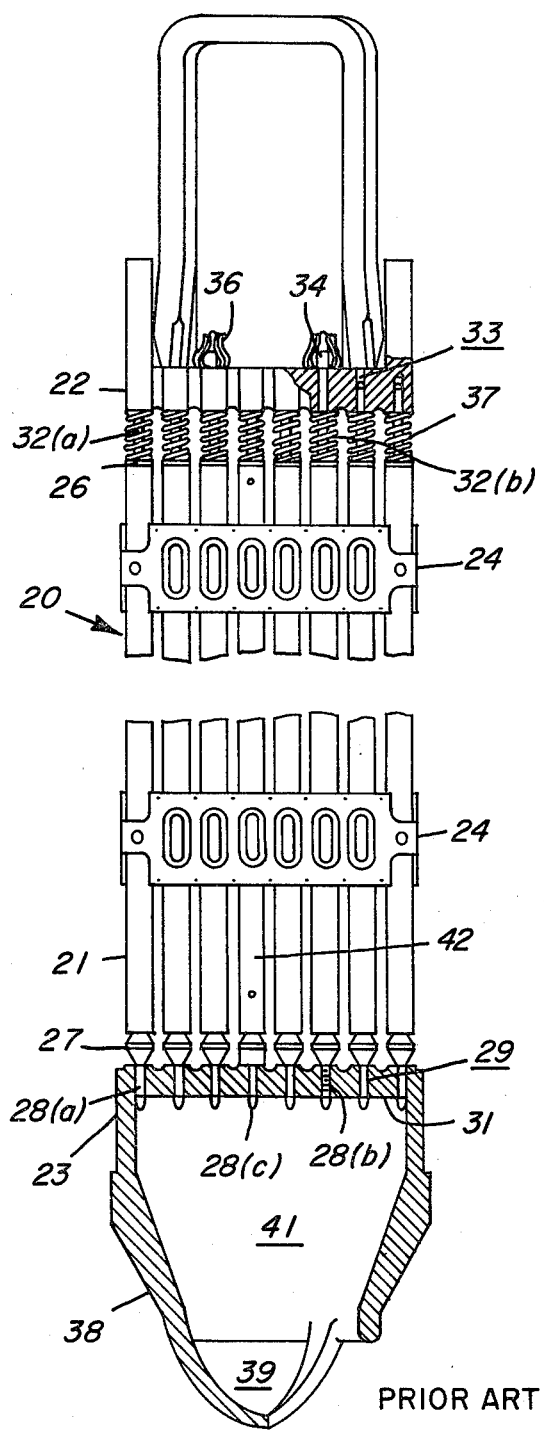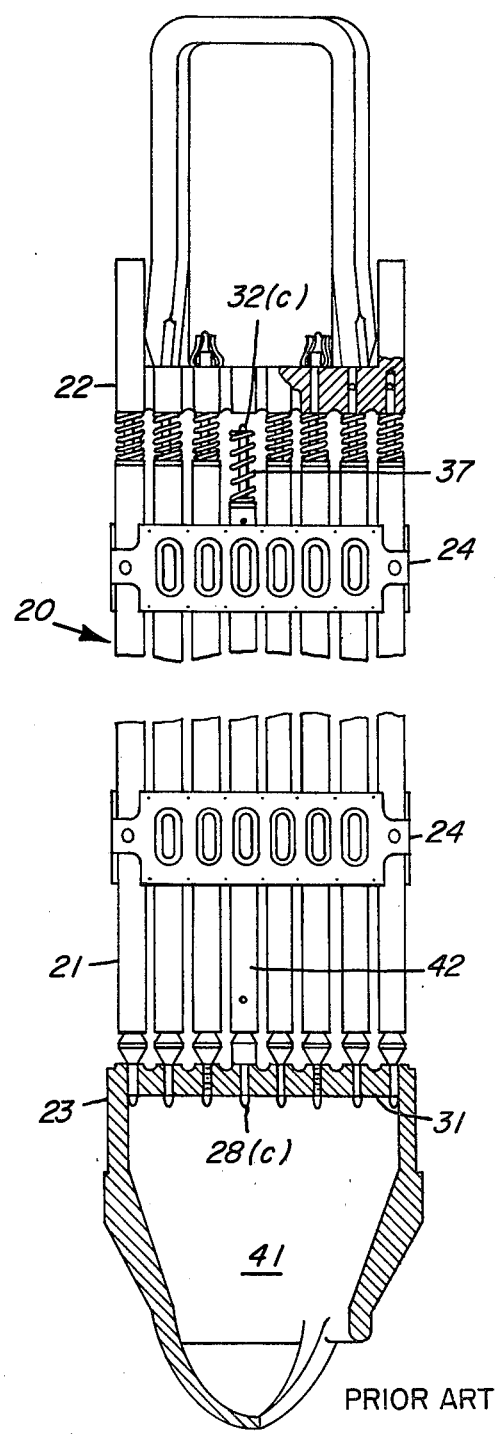
Fig. 1
Fig. 2
PRIOR ART

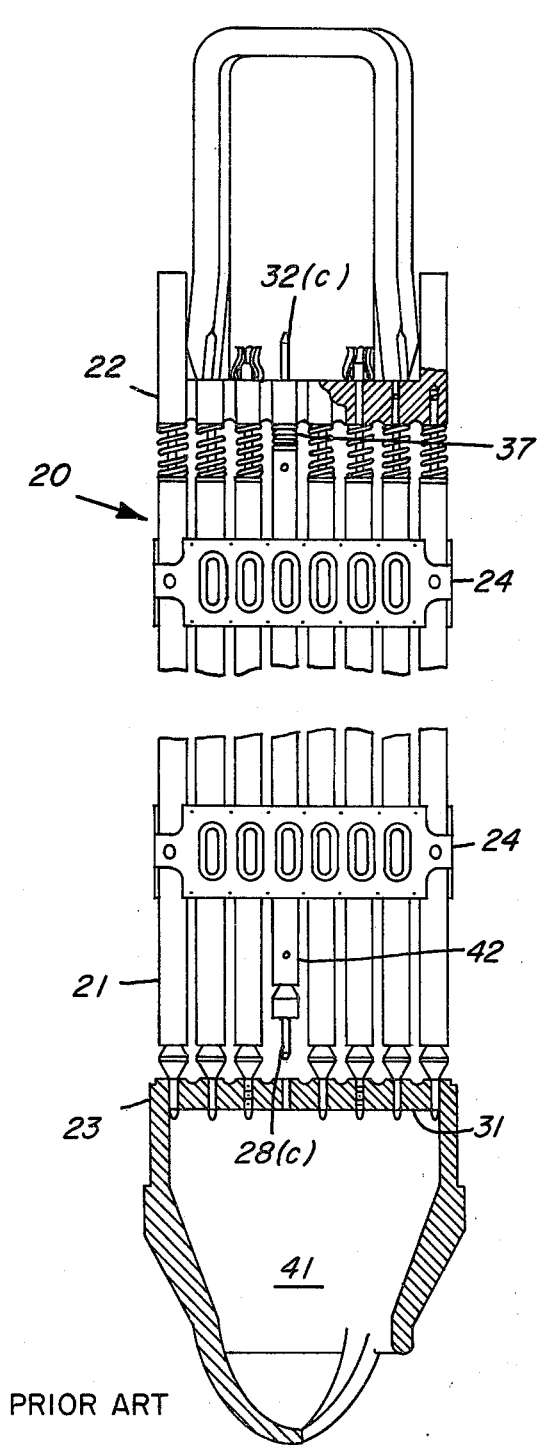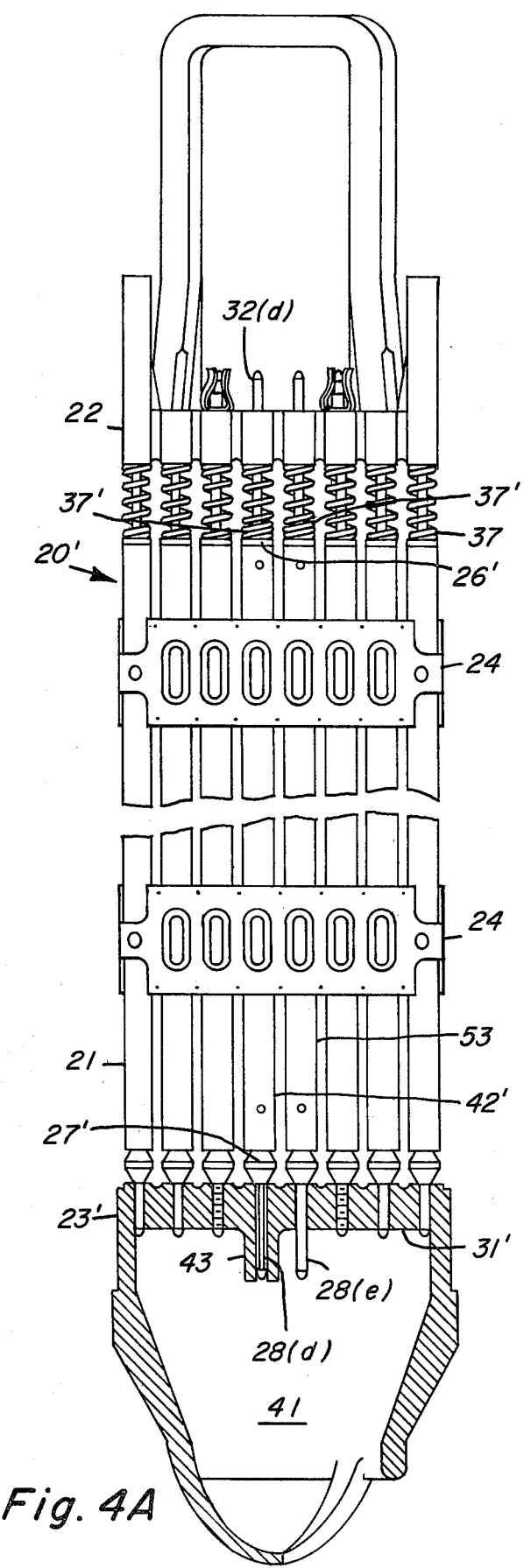
PRIOR ART
Fig. 3
Fig. 4A

NUCLEAR FUEL ASSEMBLY WITH COOLANT CONDUCTING TUBE

BACKGROUND

In known types of nuclear power reactors, for example as used in the Dresden Nuclear Power Station near Chicago, Ill., the reactor core comprises a plurality of spaced fuel assemblies arranged in an array capable of self-sustained nuclear fission reaction. The core is contained in a pressure vessel wherein it is submerged in a working fluid, such as light water, which serves both as coolant and as a neutron moderator. Each fuel assembly comprises a removable tubular flow channel, typically of approximately square cross section, surrounding an array of elongated, cladded fuel elements or rods containing suitable fuel material, such as uranium or plutonium oxide, supported between upper and lower tie plates. The fuel assemblies are supported in spaced array in the pressure vessel between an upper core grid and a lower core support. The lower tie plate of each fuel assembly is formed with a nose piece which fits in a support socket for communication with a pressurized coolant supply chamber. The nose piece is formed with openings through which the pressurized coolant flows upward through the fuel assembly flow channels to remove heat from the fuel elements. A typical fuel assembly of this type is shown, for example, by B. A. Smith et al in U.S. Pat. No. 3,689,358. An example of a fuel element or rod is shown in U.S. Pat. No. 3,378,458.

Additional information on nuclear power reactors may be found, for example, in "Nuclear Power Engineering," M. M. El-Wakil, McGraw-Hill Book Company, Inc., 1962.

A typical fuel assembly is formed, for example, by an 8×8 array of spaced fuel rods supported between upper and lower tie plates, the rods being several feet in length, on the order of one-half inch in diameter and spaced from one another by a fraction of an inch. To provide proper coolant flow past the fuel rods it is important to maintain the fuel rods in fixed spaced relation and restrain them from bowing and vibrating during reactor operation. A plurality of fuel rod spacers positioned in spaced relation along the length of the fuel assembly are provided for this purpose. Such spacers are shown, for example, by J. L. Lass et al. in U.S. Pat. No. 3,654,077.

A problem in the design of such a fuel assembly is to provide an efficient, effective structure for maintaining the fuel rod spacers in their axial spaced positions without the use of excessive structural materials. In some previous arrangements, special structural members have been provided for this purpose. It is extremely important to minimize the amount of structural material in a fuel core because such materials unproductively capture neutrons and an additional amount of costly fuel is required in the core to compensate for this neutron loss. Thus it is undesirable to use a structural member whose only purpose is to retain the spacers. In other known arrangements the spacers are axially retained by engagement with lugs or the like on one or more of the fueled rods. However, use of a fueled rod for spacer retention presents problems of high temperature strength in the face of the need to minimize cladding thickness in a fueled rod.

An efficient and effective arrangement for axially retaining the spacers is shown by J. R. Fritz et al. in U.S. Pat. No. 3,802,995 (which is incorporated herein by reference) wherein the spacers are retained in axial position by engagement with lugs projecting from a coolant conducting tube located in an interior position in the fuel assembly, this coolant conducting tube providing the additional function of increasing the neutron moderation in the inner zone of the fuel assembly.

As the trend toward higher fuel burnup exposure (i.e. longer residence time of the fuel assemblies in the core) continues a potential problem attendant the use of the spacer retaining coolant conducting tube arises. The problem is the possibility that the upper or lower end plug shank of the coolant conducting tube (hereinafter water tube) may become disengaged from its support cavity because of the greater axial growth (elongation) of the fuel rods in the reactor core environment as compared to the axial growth of the water tube.

In the high-temperature, high-neutron and gamma radiation environment of the reactor core both the fuel rods and the water tubes experience permanent axial growth. However, the axial growth of the fuel rods is significantly greater because of mechanical interaction of the fuel element cladding tube with the fuel pellets therein and the higher temperatures experienced by the cladding tube metal. The greater the exposure the greater the axial growth and, more to the point, the greater the differential growth between the fuel elements and the water tube. If this differential growth becomes great enough the previously mentioned potential problem of water tube end plug shank disengagement arises. Should such disengagement occur, coolant flow induced vibration of the now unsupported end of the water tube might become of sufficient magnitude to result in water tube contact with and potential damage to the adjacent fuel elements.

An object of the invention is an improved water tube-fuel rod spacer retaining arrangement.

A more specific object is a water tube arrangement which substantially precludes water tube disengagement and minimizes coolant flow induced vibration of the water tube.

SUMMARY

The foregoing and other objects of the invention are achieved by a spacer retaining water tube arrangement having the following features: The upper end plug shank of the water tube is lengthened sufficiently to prevent its disengagement from its support cavity in the upper tie-plate under any anticipated operating condition. The lower end plug shank is similarly lengthened to prevent its disengagement from it support cavity in the lower tie plate.

To minimize the amount of lengthening of the lower end plug shank that is necessary to prevent its disengagement from its support cavity in the lower tie plate, the distance that the water tube can move upward with respect to the tie plates is limited. This limitation of upward water tube movement can be accomplished by forming the expansion spring, fitted on the upper end plug shank between the top of the water tube and the bottom surface of the upper tie plate, with several close-spaced turns whereby the compressed length of this expansion spring is increased with respect to the compressed length of the expansion springs on the fuel rods. Alternatively, upward movement of the water tube can be limited by forming a lower portion of the water tube upper end plug shank with an enlarged diameter sufficient to prevent entry of this portion into the end plug shank support cavity in the upper tie plate.

To avoid release of the spacers, the spacer retaining water tube must be restrained from rotation. This is accomplished by forming the lower end plug shank with a square, hexagonal or other non-circular transverse cross section shape, its lower tie plate support cavity being formed of a mating shape. Turbulent coolant flow in the nose piece of the lower tie plate acting upon an exposed, extended lower end plug shank of non-circular cross section can cause flow-induced vibration thereof.

To prevent such vibration, it is a further feature of the invention that the boss in which the water tube lower tie plate support cavity is formed is extended downward from the lower tie plate support grid to surround and thus protect the extended, shaped lower end plug shank of the water tube from the turbulent coolant. Additionally, the lower end plug of the water tube is formed with a conical portion which mates with a conical seat in the upper portion of the support cavity to thus restrain the lower end plug from lateral movement.

DRAWING

These and other features of the invention are described in greater detail hereinafter with reference to the accompanying drawing wherein:

FIG. 1 is a longitudinal section view of a fuel assembly showing a water tube arrangement exemplary of the prior art;

FIG. 2 is a longitudinal section view of a fuel assembly illustrating disengagement of the upper end plug shank of the water tube;

FIG. 3 is a longitudinal section view of a fuel assembly illustrating disengagement of the lower end plug shank of the water tube;

FIG. 4A is a longitudinal view of a fuel assembly illustrating a water tube arrangement according to the invention;

DESCRIPTION

Figure 4B:
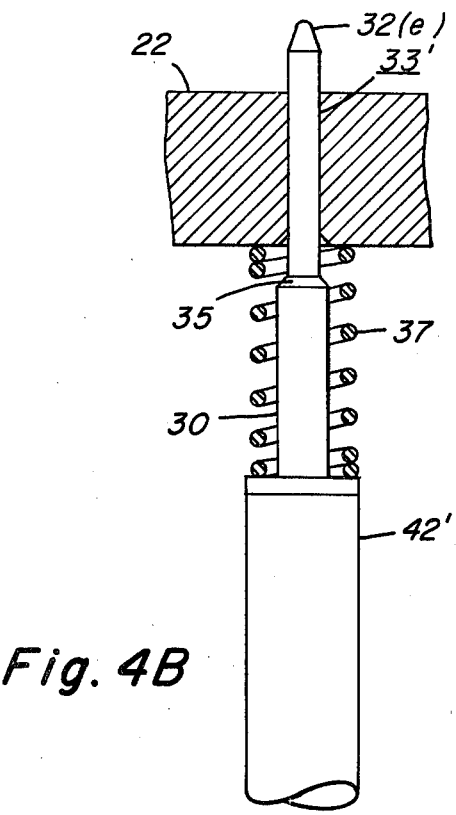
FIG. 4B illustrates an alternate arrangement for limiting upward movement of the water tube.

A fuel assembly 20 employing a water tube spacer capture arrangement exemplary of the prior art is shown in FIG. 1. The fuel assembly 20 includes a plurality of fuel rods 21 supported between a skeletonized upper tie plate 22 and a lower tie plate 23. The fuel rods pass through a plurality of fuel rod spacers 24 which provide intermediate lateral support to retain the elongated rods in spaced relation.

Each fuel rod 21 is formed of an elongated tube of suitable material, such as zirconium alloy, containing fissile fuel and other materials (such as fertile fuel, burnable absorber, inert material or the like) sealed in the tube by upper and lower end plugs 26 and 27. Lower end plugs 27 are formed with extensions or shanks 28(a) for registration and support in support cavities 29 formed in a skeletonized support grid 31 of the lower tie plate 23. Upper end plugs 26 are formed with shanks 32(a) which fit into support cavities 33 in the upper tie plate 22.

Several of the support cavities 29 (for example, selected ones of the peripheral cavities) in the support grid 31 are formed with threads to receive threaded lower end plug shanks 28(b). The shanks 32(b) of the upper end plugs of these same fuel rods are elongated to pass through their support cavities 33 in the upper tie plate 22 and are formed with threads to receive retaining nuts 34, the nuts 34 being secured from rotation by locking tab washers 36. Helical expansion springs 37 fitted on the upper end plug shanks urge the upper tie plate upward from the fuel rods 21 against the nuts 34. In this manner the upper and lower tie plates and the fuel rods are formed into a unitary structure.

The lower tie plate 23 is formed with a nose piece 38 adapted to support the fuel assembly 20 in a support socket (not shown) in the nuclear reactor. The end of the nose piece 38 is formed with openings 39 to receive pressurized coolant into a coolant receiving chamber 41 so that it flows upward through the skeletonized support grid 31 and among the fuel rods 21.

The fuel assembly 20 further includes a water tube 42, having provision for coolant flow therethrough, which replaces a fueled rod usually in a central position of the fuel assembly. The water tube 42 is formed of a hollow, water-conducting tube of suitable material (such as zirconium alloy) fitted with upper and lower end plugs. (Radially extending spacer retaining lugs, not shown in FIG. 1, fixed to the water tube 42 engage the spacers 24 and retain them in their axial positions.)

As embodied in the prior arrangement, the water tube end plugs are generally similar to those of the fuel rods 21 except that they may be formed with central coolant passages or bores for coolant flow into and out of the water tube. Also the shank 28(c) of the lower end plug of the water tube 42 is formed with, for example, a square cross section for engaging a support cavity of matching shape in the support grid 31 to prevent rotation of the water tube as explained in greater detail in the previously mentioned U.S. Pat. No. 3,802,995.

Thus in the prior arrangement the end plug shanks of the water tube 42 are comparable in length to those of the fuel rods 21. As discussed hereinbefore, upon irradiation of the fuel assembly 20 in a reactor core the fuel rods 21 experience greater axial growth (elongation) than does the water tube 42. Such axial growth of the fuel rods increases the distance between the upper tie plate 22 and the lower tie plate 23 and is a function of exposure (residence time in the core). If the differential growth between the fuel rods 21 and the water tube 42 becomes great enough there is a risk that the upper or lower end plug shanks of the water tube can become disengaged from their tie plate support cavities.

Disengagement of the upper end plug shank 32(c) of the water tube 42 from its support cavity in the upper tie plate 22 is illustrated in FIG. 2 on the assumption that the spacers 24 remain in position and the lower end plug shank 28(c) remains seated. Upon such an occurrence, the portion of the water tube 42 above the uppermost spacer 24 becomes unsupported and subject to coolant flow induced vibration with the possibility that the vibrating end of the water tube 42 might contact and damage the adjacent fuel rods 21.

Disengagement of the lower end plug shank 28(c) of the water tube 42 from its support cavity in the support grid 31 is illustrated in FIG. 3. This might occur if the hydraulic force of the coolant flow moves the spacers 24 upward whereby their engagement with the lugs on water tube 42 moves the water rod 42 upward and fully compresses the water tube expansion spring 37. The thus unsupported lower end portion of the water tube 42 would then become subject to coolant flow induced vibration with the possibility of contact with and damage to the adjacent fuel rods 21.

The problem of water tube end plug shank disengagement (as illustrated in FIGS. 2 and 3) can be avoided by fitting the water tube 42 with end plugs shanks of sufficient length. However, it was discovered that an unprotected, shaped (e.g. square transverse cross section) lower end plug shank extending below the lower surface of the support grid 31 into the coolant receiving chamber 41 is subject to vibration induced by the turbulent coolant flow in the chamber 41 with the consequent risk of undue wear on the end plug shank and its support socket. (Sufficient wear of these parts might allow rotation of the water tube 42 and consequent disengagement of the spacer retaining lugs from the spacers 24.)

Figure 5:
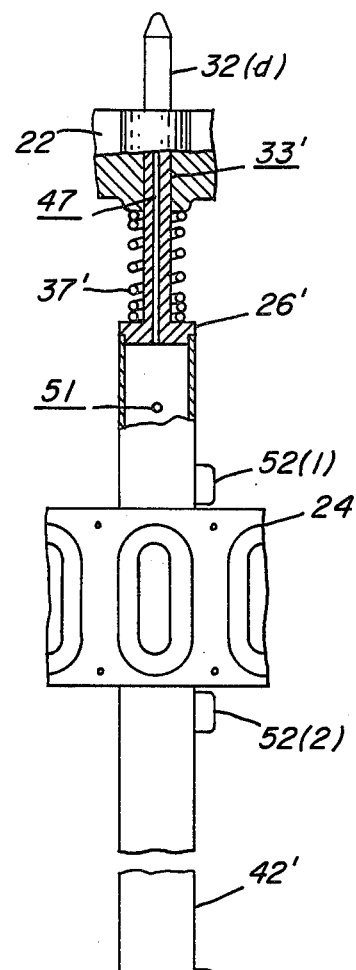
FIG. 5 is an elevation view, partly in section of a spacer retaining water tube of the invention with portions of the related components of the fuel assembly for illustration of the features of the invention with greater clarity.
Figure 5:
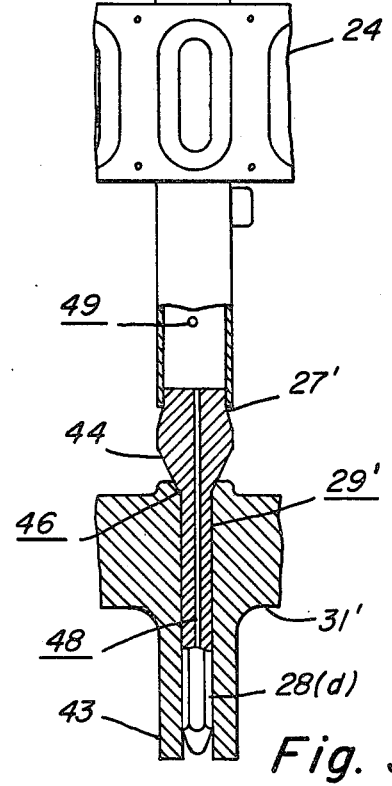

Features of the present invention for reliably preventing disengagement of either end of the spacer retaining water tube are illustrated in FIGS. 4A, 4B and 5. Spacer retaining water tube 42' is fitted with an upper end plug 26' having a lengthened end plug shank 32(d) and a lower end plug 27' having a lengthened end plug shank 28(d), the lengths of the shanks 32(d) and 28(d) being selected to prevent disengagement from their support cavities 33' and 29' under any anticipated condition of operation.

To minimize the necessary lengthening of the lower end plug shank 28(d), the water tube expansion spring 37', fitted on the shank 32(d) between the upper end plug 26' and the upper tie plate 22, is formed with several close spaced turns (e.g. 10 of a total of 25 turns) to increase the compressed length of the spring 37' and thereby limit the amount of permissible upward movement of the water tube 42'.

An alternate arrangement for minimizing the necessary lengthening of the lower end plug shank 28(d), by limiting upward movement of water tube 42', is illustrated in FIG. 4B. The upper end plug shank 32(e) is not only lengthened but it is also formed with a lower end portion 30 of enlarged diameter. The diameter of the portion 30 is sufficient to prevent entry of portion 30 into the support cavity 33' in upper tie plate 22, to thus limit upward movement of water tube 42', but the portion 30 is small enough in diameter to receive the standard expansion spring 37 so that no special expansion spring is needed. The top end of the portion 30 is preferably formed with a taper 35 to preclude "hang-up" of the expansion spring 37 when this spring is installed. The axial length of the portion 30 is selected to provide the initial clearance space between the upper end of the portion 30 and the bottom of the upper tie plate 22 that is necessary to accommodate assembly tolerances.

In its initial position, the upper end plug shank 32(d) (FIG. 5) of the water tube 42' extends, unprotected, beyond the upper surface of the upper tie plate 22. The exposed end plug shank 32(d) is circular in transverse cross section and presents no problem because end plug shanks of circular cross section are not found to be subject to significant flow induced vibration.

However, the non-circular shaped lower end plug shank 28(d) is subject to potential flow induced vibration from the turbulent coolant flow in chamber 41. To prevent such vibration, the lower end plug shank 28(d) is surrounded by a boss 43 extending downward from the lower surface of the support grid 31', the boss 43 thus also providing a lengthened support cavity 29' of increased lateral support area.

To further inhibit vibration of the lower end of the water tube 42', the lower end plug 27' is formed with a tapered or conical lower end 44 adapted to fit into a matching conical seat 46 in the upper end of the support cavity 29'. This conical seating arrangement reduces lateral play and thus aids in reducing vibration of the end plug 27' and its shank 28(d) as compared to the flush seat of the prior arrangement.

The lower end plug shank 28(d) and its mating support cavity 29' are formed with an other than circular transverse cross section shape to prevent rotation of the water tube 42'. While other shapes, such as square, can be used, a hexagonal shape is preferred because less metal removal from the support cavity 29' is required, which metal removal can be accomplished for example by broaching.

To provide coolant-moderator flow through the water tube 42', the tubular part of the water tube 42' may be formed with a plurality of coolant inlet holes 49 near the lower end and coolant outlet holes 51 near the upper end. In addition or alternatively the end plugs 26' and 27' may be formed with longitudinal bores or passages 47 and 48.

To retain the spacers 24 in axially spaced position, the water tube 42' is fitted with a pair of axial extending spacer retaining lugs for each of the spacers 24, such as a pair of lugs 52(1) and 52(2) (FIG. 5), one of which projects above the spacer and one below so as to capture the spacer 24 therebetween. Preferably the lugs of the pair 52(1) and 52(2) are spaced apart by a small amount more than the height of the spacer 24 for tolerance.

Figure 6A:
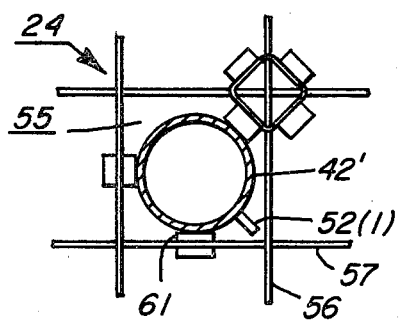
FIGS. 6A and 6B are detail plan views illustrating engagement of the spacer retaining water tube with the fuel rod spacers.
Figure 6B:
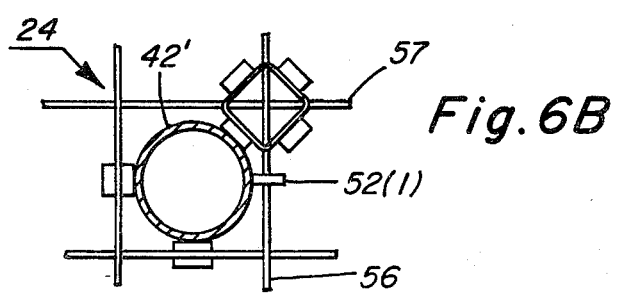

Insertion of the spacer retaining water tube 42' into the fuel assembly 20' and engagement of the spacer retaining lugs 52(1) and 52(2) with the spacers 24 is illustrated in FIGS. 6A and 6B. A water tube passage 55 of the spacers 24 is formed of interlocking divider bars 56 and 57 as shown and described in greater detail in aforementioned U.S. Pat. No. 3,654,077. The water tube 42' is inserted into the passage 55 as shown in FIG. 6A such that the retaining lugs 52(1) and 52(2) extend along the diagonal of the passage and it is moved downward until each spacer 24 is between a pair of the lugs. The water tube 42' is then rotated as shown in FIG. 6B to a position whereat the retaining lugs 52(1) project over and the retaining lugs 52(2) project under the divider bars 56 of the spacers. With the spacers 24 now captured by the retaining lugs, the water tube 42' and spacers 24 are moved downward whereby the shaped lower end plug shank 28(d) is inserted into its mating support cavity 29' to prevent rotation of the water tube 42' from its spacer retaining position.

For some applications it may be desirable to use more than one water tube in a fuel assembly. (For example, see previously mentioned U.S. Pat. No. 3,802,995.) An additional water tube is illustrated in FIG. 4A as a water tube 53. At its upper end the water tube 53 may be formed with an end plug having an extended end plug shank fitted with an expansion spring similar to the end plug shank 32(d) and modified expansion spring 37' of the spacer retaining water tube 42' or, alternatively, the upper end plug of water tube 53 may be formed with a shank having an enlarged lower end portion as shown in FIG. 4B.

An extended lower end plug shank 28(e) of the water tube 53 can be of circular cross section since this additional water tube ordinarily does not have a spacer retaining function and therefore does not require the antirotation feature. Because the circular cross section of the lower end plug shank 28(e) is not found to be subject to significant flow induced vibration, a protective boss is not essential but can be provided to eliminate the risk of any such vibration. However, it is preferred that the lower end plug of the water tube 53 be formed with a conical lower end and the support grid 31' formed with a mating conical seat similar to the conical portion 44 and mating seat 46 of the spacer retaining water tube 42' arrangement.

We claim:

1. A nuclear fuel assembly comprising: a plurality of nuclear fuel rods each fitted with an upper end plug and a lower end plug with axially extending shanks; support means providing a plurality of support positions for retaining said fuel rods in spaced array, said support means including a lower tie plate including a support grid formed with support cavities for receiving the lower end plug shanks of said fuel rods and an upper tie plate formed with support cavities for receiving the upper end plug shanks of said fuel rods, said lower tie plate further including a nose piece extending from said support grid and forming a coolant receiving chamber; a moderator containing tube in one of said support positions, said tube being fitted with an upper end plug with an axially extending upper end plug shank engaging a support cavity in said upper tie plate and a lower end plug with an axially extending lower end plug shank engaging a support cavity in said support grid of said lower tie plate, said upper end plug shank being elongated and extending substantially above the upper surface of said upper tie plate; a plurality of axially spaced spacers for laterally supporting said fuel rods and said tube; spacer retaining means fixed to said tube for engaging said spacers to prevent substantial axial displacement thereof, said lower end plug shanks of said tube and its mating support cavity in said support grid of said lower tie plate being formed with a transverse cross section shape which prevents rotation of said tube to prevent disengagement of said spacer retaining means from said spacers, said lower end plug shank of said tube being elongated and having a length greater than the length of the lower end plug shanks of said fuel rods whereby it extends substantially below the lower surface of said support grid of said lower tie plate into said coolant receiving chamber, said mating support cavity for the elongated lower end plug shank of said tube being formed with a boss extended downward into said chamber and surrounding said elongated lower end plug shank of said tube to protect it from coolant flow in said chamber whereby flow induced vibration of said elongated lower end plug shank is prevented.

2. The fuel assembly of claim 1 wherein said lower end plug of said tube is formed with a conical portion engaging a mating conical seat in its support cavity in said support grid whereby lateral movement of the lower end of said tube is minimized.

3. The fuel assembly of claim 1 including means for admitting coolant into the lower end portion of said tube and means for discharging coolant from the upper end portion of said tube.

4. The fuel assembly of claim 1 including a helical expansion spring fitted on said upper end plug shanks of said fuel rods and of said tube, said expansion spring on the upper end plug shank of said tube having a greater compressed length than the expansion springs on the upper end plug shanks of said fuel rods.

5. The fuel assembly of claim 1 wherein said upper end plug shank of said tube is formed with a lower end portion of a diameter enlarged sufficiently to prevent entry into the end plug shank support cavity of said upper tie plate whereby upward movement of said tube is limited.

6. The fuel assembly of claim 1 wherein said spacer retaining means comprises a pair of radially extending lugs for each said spacer fixed to said tube and between which each said spacer is captured.

7. The fuel assembly of claim 1 wherein said transverse cross section shape of said lower end plug shank of said tube is hexagonal.

8. The fuel assembly of claim 1 including a second moderator containing tube in another one of said support positions, said second tube being fitted with upper and lower end plugs having elongated end plug shanks compared to the end plug shanks of said fuel rods.

9. The fuel assembly of claim 8 wherein the mating support cavity in said support grid for the elongated lower end plug shank of said second tube is formed with a boss extending downward into said chamber and surrounding said elongated lower end plug shank of said second tube.

10. The fuel assembly of claim 9 wherein said lower end plug of said second tube is formed with a conical portion engaging a mating conical seat in its support cavity in said support grid.

* * * * *